April 10, 1934.    R. S. SANFORD    1,954,540

BRAKE

Filed Sept. 21, 1932

INVENTOR.
ROY S. SANFORD
BY
ATTORNEY.

Patented Apr. 10, 1934

1,954,540

UNITED STATES PATENT OFFICE 1,954,540

BRAKE

Roy S. Sanford, South Bend, Ind., assignor to Bendix Aviation Corporation, South Bend, Ind., a corporation of Delaware Application September 21, 1932, Serial No. 634,251

17 Claims. (Cl. 188—79.5)

This invention relates to brakes and more particularly to internal expanding brakes.

Heretofore, many devices have been developed for automatically adjusting the friction elements of a brake to compensate for wear of the lining. Such devices as are in use have not proved generally satisfactory because adjustment is effected on forward braking when the brake drum is heated and hence expanded. When the adjustment takes place under this condition, the friction elements invariably fit too closely within the drum when the drum has cooled and returned to normal condition. The present invention aims to overcome this objection.

An object of the invention is to provide means for automatically adjusting a friction element of the brake only on reverse braking.

Another object of the invention is to provide an automatic adjustment for the friction element of a brake controlled by the friction element and which remains inoperative upon forward braking and becomes operative on reverse braking only.

A further object of the invention is to provide means operated by movement of a friction element to automatically adjust the over-all length of the element.

Still a further object of the invention is to provide means controlled by a friction element for automatically adjusting the length of the element, adjustment being effected only on reverse braking.

Other objects of the invention will appear from the following description taken in connection with the drawing, which forms a part of this specification, and in which.

Figure 1:
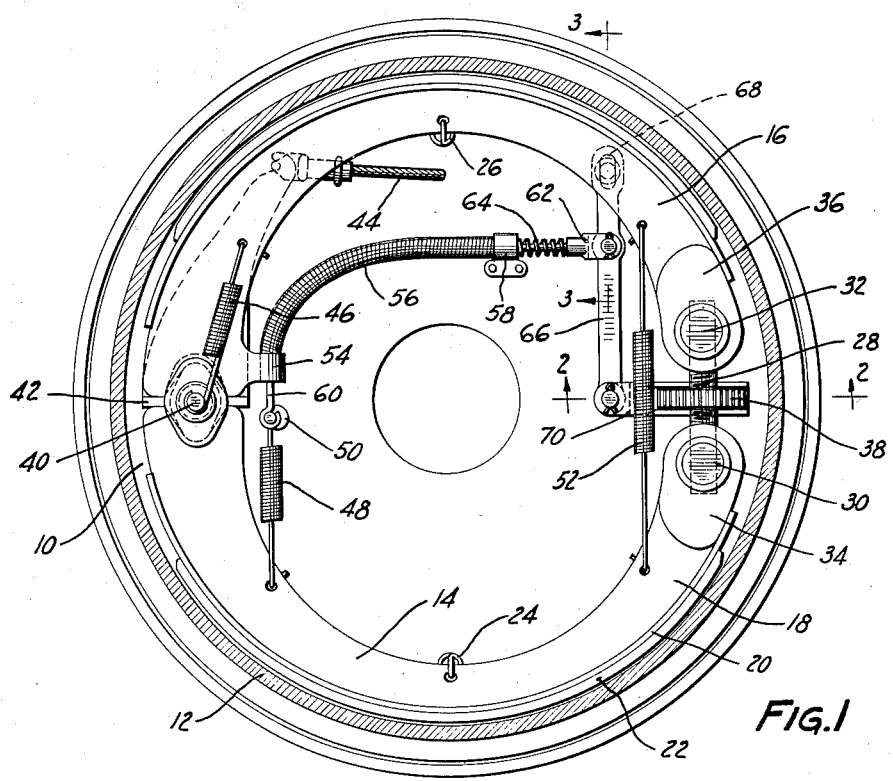
Figure 1 is a vertical section of a brake taken just back of the head of the drum illustrating the friction elements in side elevation and showing the invention as applied.
Figure 2:
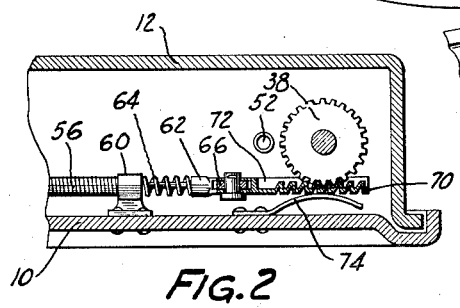
Figure 2 is a sectional view substantially on line 2—2, Figure 1.

Referring to the drawing for more specific details of the invention, 10 represents a fixed support such as a backing plate. The backing plate has associated therewith a rotatable drum 12, and positioned on the backing plate is a friction element comprising a primary shoe 14 and a secondary shoe 16. Each of the shoes include a web 18 supporting a rim 20 to which is suitably secured a lining 22 adaptable for cooperation with the braking surface of the drum.

As shown, the shoes are supported on suitable steady rests 24 and 26 and are connected at their articulated ends by an adjusting member 28 including right and left screws threaded into pivots 30 and 32 journaled in reinforcing members 34 and 36 on the articulated ends of the shoes and a pinion 38, the object of which will hereinafter appear.

Positioned between the separable ends of the shoes is an anchor 40 on which is mounted a floating operating cam 42 engaging the separable ends of the shoes, and the cam is connected as by a cable 44 to a source of power, not shown. A return spring 46 connects the shoe 16 to the anchor, and return spring 48 connects the shoe 14 to an adjustable support 50 on the backing plate, and connected between the shoes 14 and 16 is an auxiliary return spring 52. These springs serve to return and retain the shoes in the off position.

The secondary shoe 16, which is the shoe which is anchored in forward braking and which leaves the anchor in reverse braking, has formed thereon a lug 54 to which is suitably secured by one end a flexible conduit 56, the other end of which is secured to the backing plate by a suitable clip 58, and positioned in the conduit 56 is a cable 60. The respective ends of the cable 60 extend from the ends of the conduit 56. One end of the cable 60 is connected to the adjustable stop 50 and the other end of the cable has secured thereto a clevis 62. Wound on the cable between the clevis 62 and the clip 58 is a spring 64. This spring imposes tension on the cable and normally retains it in the idle position.

The clevis 62 is pivotally connected to a lever 66, one end of which is fulcrumed on the backing plate as indicated at 68, and the other end has pivotally secured thereto a rack 70 engaging the pinion 38. The rack has spaced parallel flanges 72 which engage the sides of the pinion to retain the rack in engagement therewith, and the rack is urged against the pinion by a leaf spring 74 suitably secured to the backing plate.

Figure 4:
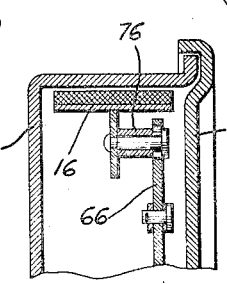
Figure 4 is a modified form showing the lever fulcrumed on the shoe.

A modification is illustrated in Figure 4 wherein the lever 66 is pivoted on the web 18 of the shoe 16 as indicated at 76, so that the lever may ride with the shoe. This materially reduces friction between the adjusting device and the backing plate.

Figure 5:
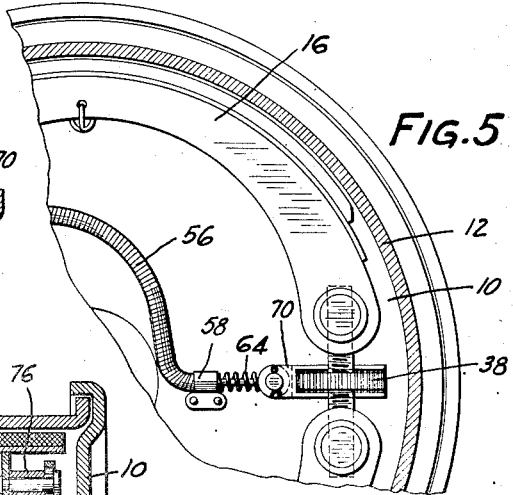
Figure 5 illustrates a brake partly in elevation and partly broken away showing a further modification of the invention.
Figure 3:
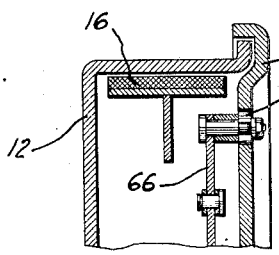
Figure 3 is a sectional view substantially on line 3—3, Figure 1 showing the lever for the device pivoted on the backing plate.

A further modification is illustrated in Figure 5 wherein the lever 66 is omitted and the operating cable 60 connected directly to the rack 70. This simplified form may be found desirable in small brake structures.

When force is applied to the cable 44, the separable ends of the primary and secondary shoes are spread apart by the cam 42 causing the shoes to engage the braking surface of the drum.

Assuming that the brake is applied in forward braking, the primary shoe 14 upon engaging the braking surface of the drum is given a slight centrifugal movement by the wiping action of the drum. This movement is transmitted through the adjusting device 28 to the secondary shoe 16 causing a slight centrifugal movement of the secondary shoe and the anchoring thereof on the anchor 40. In this operation the movement of the secondary shoe 16 on the backing plate is slight because of its anchorage on the anchor 40, and movement of the conduit 56 connected to the shoe is nil or negligible.

Assuming that force is applied to operate the brake on reverse braking, the secondary shoe 16 moves away from the anchor 40 to engage the drum, whereupon circumferential movement is imparted to the shoe 16, and this movement is transmitted through the adjusting device 28 to the primary shoe 14 causing this shoe to anchor on the anchor 40. In this operation, which is reverse braking, movement of the secondary shoe is greater than in forward braking.

During this movement of the shoe 16, the conduit 56 is bent or flexed and this bending or flexing causes a shortening of the cable 60. As the cable shortens it moves the lever 66 to slide the rack 70 past the pinion. When the brake is released friction on the pinion screws is reduced, due to the removal of the braking load, whereupon spring 64 functions to move rack causing pinion 38 to rotate and thereby adjust the friction element.

In the modification shown in Figure 5, the operation is substantially the same, except that the conduit 56 is connected to a clip substantially in alignment with the rack. Therefore, the shortening of the cable by bending or flexing does not function through the lever 66 but acts directly on the rack.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising an anchor, a friction element anchoring thereon in forward braking and moving away from the anchor in reverse braking, and means controlled by movement of the friction element away from the anchor for automatically operating an adjusting means only on reverse braking.

2. A brake comprising a friction element having a part which has one movement in forward braking and a different and greater movement in reverse braking, means for adjusting the element and means controlled by the reverse-braking movement of said part of the element for actuating the adjusting means only on reverse braking.

3. A brake comprising a friction element having a part which has one movement in forward braking and a different and greater movement in reverse braking, means for adjusting the element and means controlled by the reverse-braking movement of said part of the friction element for automatically actuating the adjusting means only on reverse braking.

4. A brake comprising at least two friction elements one of which moves away from its anchored position in forward braking and the other of which moves away from its anchored position in reverse braking, adjusting means connecting the friction elements and means operable by movement from anchored position of said other element for automatically operating the adjusting means.

5. A brake comprising at least two friction elements, adjusting means connecting the friction elements, a flexible conduit secured to one of said elements at one end and held at its other end so that it is flexed by movement of said element, a member in said conduit one end of which is held adjacent said one end of the conduit and which is operatively connected to said adjusting means at its other end and which is tensioned by the flexing of the conduit to operate the adjusting means.

6. A brake comprising at least two friction elements, one of which anchors in forward braking and the other of which anchors in reverse braking, adjusting means connecting the friction elements and means connected to said one friction element for actuating the adjusting means only on reverse braking without being affected on forward braking.

7. A brake comprising at least two friction elements, adjusting means connecting the elements, a lever for actuating the adjusting means and means for actuating the lever including a conduit and a cable.

8. A brake comprising two friction elements, an adjusting device connecting the adjacent ends of the elements, an adjustable support, a lever for operating the adjusting means, a flexible conduit connected between one of the friction elements and a fixed support and a cable in the conduit having one end connected to the lever and its other end connected to the adjustable support.

9. A brake comprising two friction elements, an expansible member connecting the friction elements, an operating member between the separable ends of the friction elements, an adjustable support, a conduit having one end connected to one of the friction elements and its other end connected to a fixed support, a cable positioned in the conduit having one end connected to the adjustable support and its other end arranged to operate the expansible member.

10. A brake comprising at least two friction elements, an expansible member connecting the friction elements, means for operating the expansible member, an operating member for actuating the friction elements, an adjustable support, a flexible conduit connected between one of the friction elements and a fixed support and a cable in the conduit having one end connected to an adjustable support and its other end connected to said means.

11. A brake comprising a plurality of friction elements, an expansible member connecting two of the friction elements, a fixed support, an adjustable support, a flexible conduit connecting one of the friction elements and the fixed support and a cable in the conduit having one of its ends connected to the adjustable support and its other end arranged to operate the expansible member.

12. A brake comprising a plurality of friction elements, an expansible member connecting two of the friction elements, means for operating the expansible member including a rack and pinion, a lever connected to the rack and fulcrumed separately from said elements, and means connecting the lever to one of the friction elements.

13. A brake comprising friction elements, expansible means connecting the friction elements, an operating member for the friction elements, an actuating means for the expansible member including a rack and pinion, a lever connected to the rack, a fixed support, an adjustable support, a flexible conduit connecting the fixed support to one of the friction elements, a cable in the conduit having one end connected to the adjustable support and its other end connected to the lever.

14. A brake comprising friction elements, an expansible means connecting the friction elements, an operating member for the friction elements, means for operating the expansible means including a rack and pinion, a lever having one end pivoted to the rack and its other end pivoted to one of the friction elements, a fixed support, an adjustable support, a flexible conduit connecting the fixed support and one of the friction elements, a spring between the fixed support and the lever, a cable in the conduit having one end connected to the adjustable support and its other end connected to the lever.

15. A brake comprising friction elements, a backing plate carrying said elements, an expansible member connecting the friction elements including a pinion, a slidable member having teeth engaging the pinion and means for retaining the teeth on the slidable member in engagement with the teeth on the pinion and including a spring confined between said member and the backing plate.

16. A brake comprising friction elements, an expansible member connecting the friction elements including a pinion, a slidable member having a longitudinal slot receiving the pinion, a rack in the bottom of the slot engaging the pinion and a compression member retaining the rack in engagement with the pinion.

17. A brake comprising friction elements, an expansible member connecting the friction elements, a fixed support, a flexible conduit connecting the fixed support to one of the friction elements, an adjustable support and a cable in the conduit having one end connected to the adjustable support and its other end connected through linkage to the expansible member.

ROY S. SANFORD.